US010291335B1

(12) United States Patent
Wen et al.

(10) Patent No.: US 10,291,335 B1
(45) Date of Patent: May 14, 2019

(54) BEAMFORMING CALIBRATION SYSTEM AND METHOD

(71) Applicant: INDUSTRIAL TECHNOLOGY RESEARCH INSTITUTE, Hsinchu (TW)

(72) Inventors: Chao-Kai Wen, Kaohsiung (TW); Chang-Jen Wang, New Taipei (TW); Jung-Chieh Chen, Meishan Township, Chiayi County (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 0 days.

(21) Appl. No.: 15/855,765

(22) Filed: Dec. 27, 2017

(30) Foreign Application Priority Data

Dec. 4, 2017 (TW) .............................. 106142431 A

(51) Int. Cl.
*H04B 17/12* (2015.01)
*H04B 7/06* (2006.01)

(52) U.S. Cl.
CPC .......... *H04B 17/12* (2015.01); *H04B 7/0617* (2013.01)

(58) Field of Classification Search
CPC .............................. H04B 17/12; H04B 7/0617
See application file for complete search history.

(56) References Cited

U.S. PATENT DOCUMENTS 6,551,246 B1 * 4/2003 Ustuner .............. G01S 7/52026
600/447
7,705,779 B2 * 4/2010 Goldberg ................. H01Q 3/40
342/373

(Continued)

FOREIGN PATENT DOCUMENTS

| CN | 101483274 | 7/2009 |
| CN | 103210592 B | 4/2016 |

(Continued)

OTHER PUBLICATIONS

Björnson et al., "Optimal coordinated beamforming in the multicell downlink with transceiver impairments," 2012 IEEE Global Communications Conference, 2012, pp. 4775-4780.

(Continued)

*Primary Examiner* — Freshteh N Aghdam
(74) *Attorney, Agent, or Firm* — Muncy, Geissler, Olds & Lowe, P.C.

(57) ABSTRACT

The beamforming calibration system includes a transmitter, a receiver, and a computing device. The transmitter includes multiple transmitting antennas. The computing device provides multiple phase sets to the transmitter. When the computing device provides a first phase set among the phase sets to the transmitter: the transmitter uses the first phase set to set phases of the transmitting antennas, the receiver receives wireless transmission signal from the transmitting antennas to obtain a first radiation pattern corresponding to the first phase set, and the computing device is configured to compare the first radiation pattern with a predetermined (Continued)

pattern to calculate a pattern similarity score corresponding to the first phase set. The computing device selects a calibration phase set among the phase sets according to the pattern similarity score of each phase set, and provides the calibration phase set to the transmitter to calibrate beamforming.

20 Claims, 4 Drawing Sheets

(56) References Cited

U.S. PATENT DOCUMENTS

| | | | |
|---|---|---|---|
| 7,986,755 | B2 | 7/2011 | Tung et al. |
| 8,428,529 | B2 | 4/2013 | Dakshinamurthy et al. |
| 8,693,964 | B2 | 4/2014 | Nabar et al. |
| 8,891,597 | B1 | 11/2014 | Zhang et al. |
| 8,971,178 | B1 | 3/2015 | Nabar et al. |
| 9,130,277 | B2 | 9/2015 | Lin |
| 9,319,904 | B1 | 4/2016 | Srinivasa et al. |
| 9,641,317 | B2 | 5/2017 | Sestok, IV et al. |
| 9,661,506 | B2 | 5/2017 | Chen et al. |
| 9,806,777 | B1* | 10/2017 | Doostnejad .......... H04B 7/0456 |
| 2008/0089396 | A1 | 4/2008 | Zhang et al. |
| 2008/0303718 | A1* | 12/2008 | Chiang ................... H01Q 3/40 342/373 |
| 2014/0050280 | A1* | 2/2014 | Stirling-Gallacher ...................... H04B 7/0486 375/296 |
| 2016/0105260 | A1* | 4/2016 | Zhang ................. H04L 1/0083 370/329 |
| 2016/0337049 | A1 | 11/2016 | Dhakal et al. |
| 2017/0078009 | A1 | 3/2017 | Nabar et al. |
| 2017/0155439 | A1* | 6/2017 | Chang ................. H04B 7/0617 |
| 2018/0091947 | A1* | 3/2018 | Shirakata .............. H04W 4/025 |
| 2018/0115065 | A1* | 4/2018 | Valdes Garcia ........ G01S 13/00 |

FOREIGN PATENT DOCUMENTS

| | | |
|---|---|---|
| EP | 2541679 | 1/2013 |
| TW | 201618379 | 5/2016 |
| TW | 201633741 A | 9/2016 |
| WO | WO2008/036670 A3 | 3/2008 |

OTHER PUBLICATIONS

Hakkarainen et al., "Widely-Linear Beamforming and RF Impairment Suppression in Massive Antenna Arrays," Journal of Communications and Networks, vol. 15, No. 4, Aug. 2013, pp. 383-397.
Lanne et al., "Optimized Beamforming Calibration in the Presence of Array Imperfections," 2007 IEEE International Conference on Acoustics, Speech and Signal Processing, 2007, pp. II-973-II-976.
Cohen et al., "A CMOS Bidirectional 32-Element Phased-Array Transceiver at 60 GHz With LTCC Antenna," IEEE Transactions on Microwave Theory and Techniques, vol. 61, No. 3, Mar. 2013, pp. 1359-1375.
Koh et al., "A Millimeter-Wave (40-45 GHz) 16-Element Phased-Array Transmitter in 0.18-$\mu$ m SiGe BiCMOS Technology," IEEE Journal of Solid-State Circuits, vol. 44, No. 5, May 2009, pp. 1498-1509.
Minasian et al., "The Impact of Hardware Calibration Errors on the Performance of Massive MIMO Systems," 2016 IEEE Global Communications Conference (GLOBECOM), 2016, pp. 1-6.
TIPO. Office Action. dated Nov. 27, 2018. 5 pages.

* cited by examiner

| Antenna | Phase State | | | | | | | | | |
|---|---|---|---|---|---|---|---|---|---|---|
| 1 | 1 | 2 | ③ | 4 | 5 | 6 | 7 | 8 | 9 | 10 |
| 2 | 1 | 2 | 3 | ④ | 5 | 6 | 7 | 8 | 9 | 10 |
| 3 | 1 | 2 | 3 | 4 | ⑤ | 6 | 7 | 8 | 9 | 10 |
| 4 | 1 | 2 | 3 | 4 | 5 | 6 | 7 | 8 | 9 | ⑩ |
| 5 | 1 | 2 | 3 | 4 | 5 | 6 | ⑦ | 8 | 9 | 10 |

FIG. 6

BEAMFORMING CALIBRATION SYSTEM AND METHOD

This application claims the benefit of Taiwan application Serial No. 106142431, filed Dec. 4, 2017, the disclosure of which is incorporated by reference herein in its entirety.

TECHNICAL FIELD

The disclosure relates in general to wireless signal transmission using multiple antennas. and more particularly to a beamforming calibration system and method.

BACKGROUND

Compared with the third generation (3G) or fourth generation (4G) communication systems commonly used today, the millimeter wave (mmWave) communication system uses a relatively high frequency band for communication. Since the energy strength of the electromagnetic wave received by the receiver is proportional to the wavelength of the electromagnetic wave signal and inversely proportional to the square of the signal transmission distance, the millimeter wave communication system increases the signal energy attenuation due to the use of the short-wavelength high-frequency signal. In addition, due to the use of high-frequency electromagnetic signals, the ability of transmitting and receiving signals through obstacles in the millimeter wave communication system is reduced. The oxygen and water vapor in the air also absorb the millimeter wave energy. Therefore, in order to ensure the communication quality, transceivers in the millimeter wave communication system usually adopt multiple antenna beamforming technique to improve the problem of signal energy attenuation.

Beamforming is a signal processing technique. Generally an antenna array including multiple antennas is disposed on a base station or a user equipment. By adjusting transmission signals of the antennas, signals at particular angles experience constructive interference, while signals at other particular angles experience destructive interference. The base station or user equipment can thus produce a directional beam, thereby improving the communication quality from the transmitter to the receiver. The benefits of the beamforming technique include energy concentration, increased signal transmission distance. reduced user-to-user interference, and fast data rate. Because the beamforming technique has an important influence on the performance of a millimeter wave wireless communication system, there is a need to provide a system and method capable of performing beamforming calibration in order to achieve a more accurate beamforming result.

SUMMARY

The disclosure relates to a beamforming calibration system and method which considers errors caused by the hardware and sets appropriate phases for the transmitting antennas to achieve beamforming calibration.

According to one embodiment, a beamforming calibration system is provided. The beamforming calibration system includes a transmitter, a receiver, and a computing device. The transmitter includes multiple transmitting antennas. The computing device is configured to provide multiple phase sets to the transmitter. When the computing device provides a first phase set among the phase sets to the transmitter: the transmitter is configured to use the first phase set to set phases of the transmitting antennas, the receiver is configured to receive wireless transmission signal from the transmitting antennas to obtain a first radiation pattern corresponding to the first phase set, and the computing device is configured to compare the first radiation pattern with a predetermined pattern to calculate a pattern similarity score corresponding to the first phase set. The computing device is configured to select a calibration phase set among the phase sets according to the pattern similarity score of each phase set, and to provide the calibration phase set to the transmitter to calibrate beamforming.

According to another embodiment, a beamforming calibration method for a transmitter, a receiver, and a computing device is provided. The transmitter includes multiple transmitting antennas. The beamforming calibration method includes the following steps. The computing device provides multiple phase sets to the transmitter. Perform the following steps when the computing device provides a first phase set among the phase sets to the transmitter: (a) the transmitter uses the first phase set to set phases of the transmitting antennas; (b) the receiver receives wireless transmission signal from the transmitting antennas to obtain a first radiation pattern corresponding to the first phase set; and (c) the computing device compares the first radiation pattern with a predetermined pattern to calculate a pattern similarity score corresponding to the first phase set. The computing device selects a calibration phase set among the phase sets according to the pattern similarity score of each phase set. The computing device provides the calibration phase set to the transmitter to calibrate beamforming.

BRIEF DESCRIPTION OF THE DRAWINGS

FIG. 6 shows a diagram illustrating phase sets close to the initial phase set according to one embodiment of the disclosure.

Figure 1:
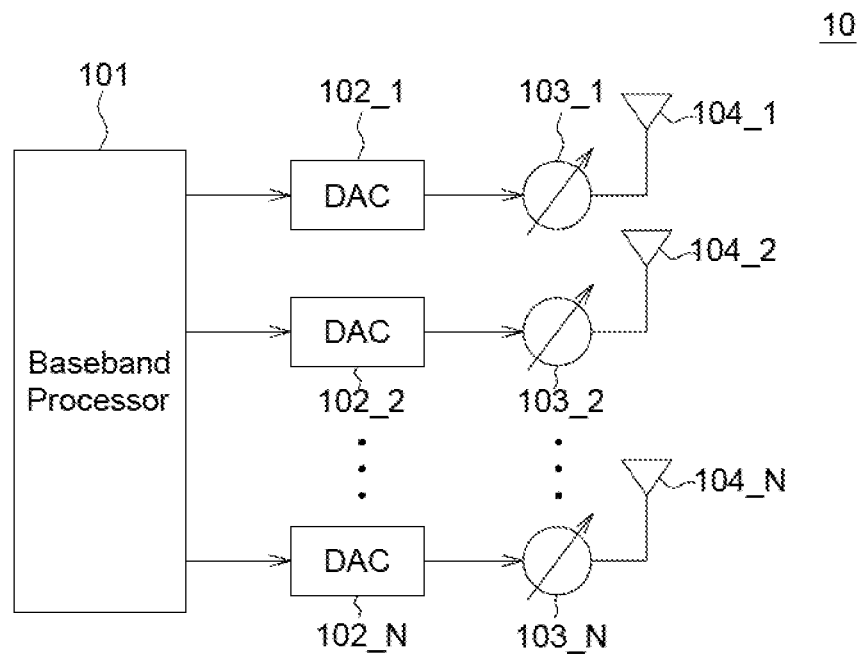
FIG. 1 shows a diagram of a transmitter according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Beamforming techniques may be divided into fixed beamforming and adaptive beamforming. For example, a base station acting as a transmitter may transmit beams in different directions in sequence until a connection with a user equipment is established in the correct direction. This step may be referred to as fixed beam forming. When the base station and the user equipment have established a connection with each other, the direction and amplitude of the beam may be fine-tuned according to the channel information between the base station and the user equipment. This step may be referred to as adaptive beamforming.

Fixed beamforming may be achieved using phase rotators (PR) in an array antenna. The phase rotator may rotate multiple fixed phase angles for the individual antenna to achieve the desired beamforming. FIG. 1 shows a diagram of a transmitter according to one embodiment of the disclosure. The transmitter 10 includes a baseband processor 101, multiple digital to analog converter (DAC) 102_1-102_N, multiple phase rotators 103_1-103_N, and multiple transmitting antennas 104_1-104_N. The baseband processor 101 is configured to process baseband signals. The DAC 102_1-102_N may convert the baseband digital signals to the analog radio frequency signals. The output of each DAC 102_1-102_N may be coupled to one of the phase rotators 103_1-103_N. Each phase rotator 103_1-103_N may set the phase angle of each transmitting antenna 104_1-104_N respectively, so as to transmit wireless radio frequency signal through the transmitting antennas 104_1-104_N. FIG. 1 shows an exemplary circuit structure of the transmitter. The present invention is not limited to the circuit structure shown in FIG. 1. The transmitter 10 may also use other hardware circuit implementation.

The transmitter 10 shown in FIG. 1 includes multiple hardware circuit components. There may be many errors in the hardware components, and the hardware errors may gradually change with time. When these hardware errors exist in the transmitter 10, the main transmission direction of the composite beam may be shifted, transmitted in a wrong direction, or the beam energy may be attenuated due to the gain and phase error of the hardware. It then becomes difficult to achieve fixed beamforming correctly, making it difficult to establish connection between the base station and the user equipment. A beamforming calibration system and method is presented in the following disclosure in consideration of the impact of hardware errors.

Figure 2:
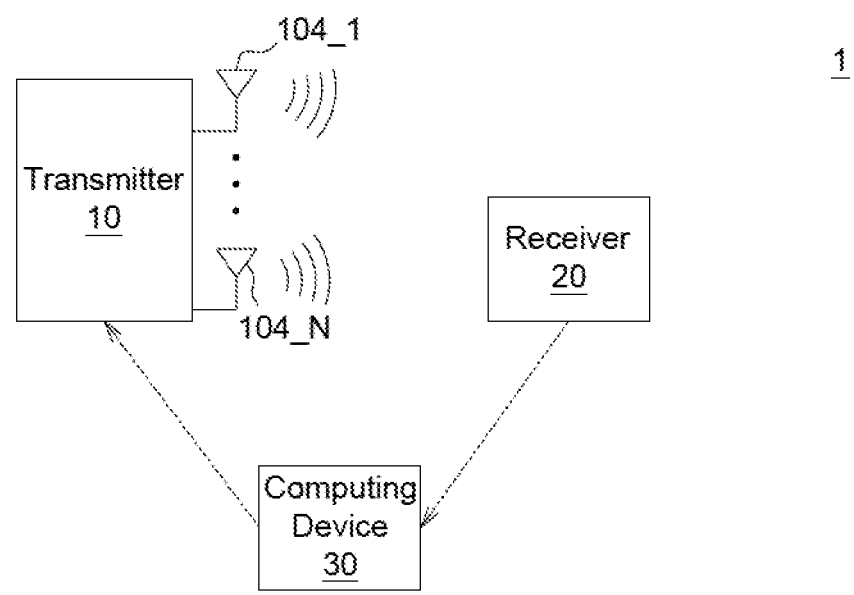
FIG. 2 shows a diagram of a beamforming calibration system according to one embodiment of the disclosure.

FIG. 2 shows a diagram of a beamforming calibration system according to one embodiment of the disclosure. The beamforming calibration system 1 includes a transmitter 10, a receiver 20, and a computing device 30. The transmitter 10 includes multiple transmitting antennas 104_1-104_N. The computing device 30 is configured to provide multiple phase sets to the transmitter 10. When the computing device 30 provides a first phase set among the phase sets to the transmitter 10: the transmitter 10 is configured to use the first phase set to set phases of the transmitting antennas 104_1-104_N, the receiver 20 is configured to receive wireless transmission signal from the transmitting antennas 104_1-104_N to obtain a first radiation pattern P_01 corresponding to the first phase set, and the computing device 30 is configured to compare the first radiation pattern P_01 with a predetermined pattern P0 to calculate a pattern similarity score corresponding to the first phase set. The computing device 30 is configured to select a calibration phase set among the phase sets according to the pattern similarity score of each phase set, and to provide the calibration phase set to the transmitter 10 to calibrate beamforming.

As the system shown in FIG. 2, the transmitter 10 is for example an antenna array, a wireless base station, or a user equipment. The receiver 20 is for example a horn antenna, a wireless base station, or a user equipment. The transmitter 10 and the receiver 20 may communicate with each other with wireless signal transmission. The receiver 20 ay include a power sensor for detecting the wireless signal strength from the transmitter 10. The transmitter 10 and the receiver 20 may have rotation mechanisms, such as a physical hardware rotation external to the instrument, or an analog signal rotation using signal processing methods within the instrument. The signal strength at different angles may be measured with such rotation mechanism.

The computing device 30 may be a microcontroller, a microprocessor, a digital signal processor (DSP), an application specific integrated circuit (ASIC), a digital logic circuit, a mobile computing device a computer, or an electronic device capable of performing computation tasks. In one embodiment the computing device 30 may be a computer, which is connected to the receiver 20 through wires to obtain the required information from the receiver 20. In another embodiment, the computing device 30 may be a processor embedded in the receiver 20. The receiver 20 is for example a base station. The computing device 30 may provide multiple phase sets to the transmitter 10 through wired network or wireless network.

Figure 3:
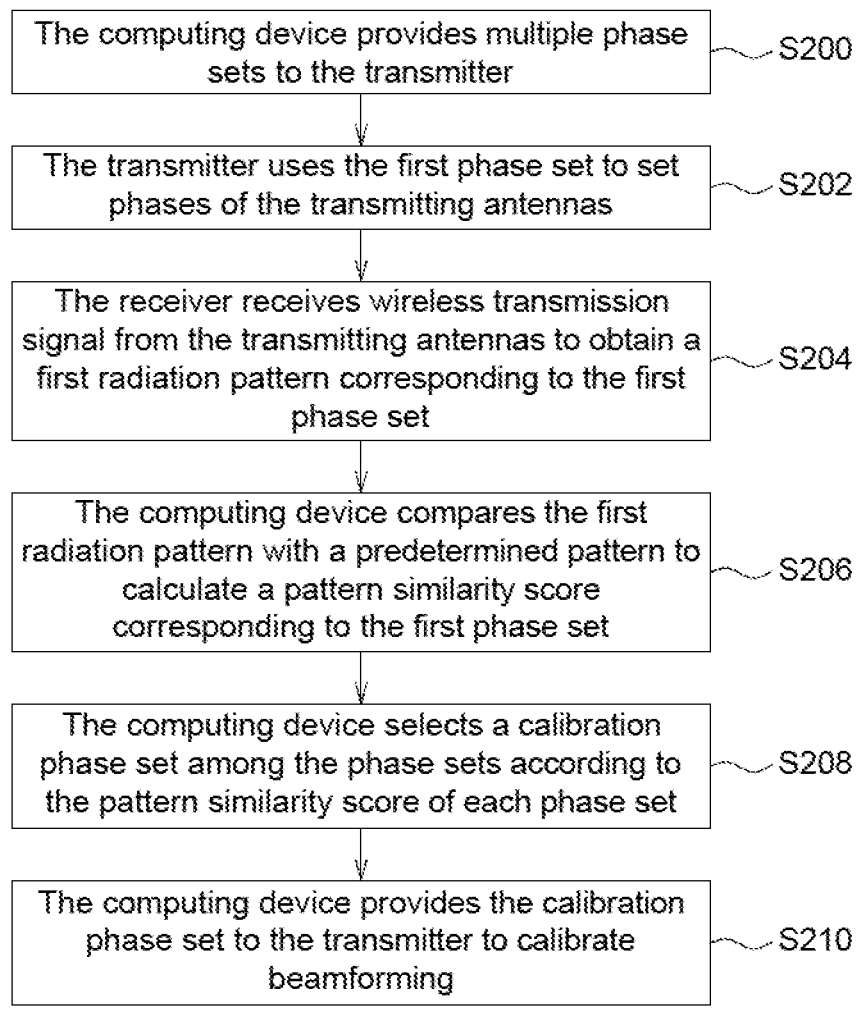
FIG. 3 shows a flowchart of a beamforming calibration method according to one embodiment of the disclosure.

A beamforming calibration method used in the system shown in FIG. 2 may be referred in FIG. 3, which shows a flowchart of a beamforming calibration method according to one embodiment of the disclosure. The beamforming calibration method includes the following steps. Step S200: The computing device 30 provides multiple phase sets to the transmitter 10. Steps S202-S206 are performed when the computing device 30 provides a first phase set among the phase sets to the transmitter 10. Step S202: the transmitter 10 uses the first phase set to set phases of the transmitting antennas 104_1-104_N. Step S204: the receiver 20 receives wireless transmission signal from the transmitting antennas 104_1-104_N to obtain a first radiation pattern P_01 corresponding to the first phase set. Step S206: the computing device 30 compares, the first radiation pattern P_01 with a predetermined radiation pattern P0 to calculate a pattern similarity score corresponding to the first phase set. Step S208: The computing device 30 selects a calibration phase set among the phase sets according to the pattern similarity score of each phase set. Step S210: The computing device 30 provides the calibration phase set to the transmitter 10 to calibrate beamforming.

The phase set in the step S200 represents the phase setup for each transmitting antenna. For example, the number of the transmitting antennas 104_1-104_N is N. Each phase set includes N phase setup values, and each phase setup value corresponding to one of the N transmitting antennas.

In the step S202, the computing device 30 may transmit the first phase set to the transmitter 10 through wired network or wireless network, such that the transmitter 10 sets phases of the transmitting antennas 104_1-104_N to transmit wireless signal to the receiver 20.

In the step S204, the receiver 20 may obtain the first radiation pattern P_01 corresponding to the first phase set according to the received signal. The first radiation pattern P_01 may include the signal strength or signal power received at different angles of the receiver 20. Polar coordinates or linear coordinates may be used when plotting the antenna radiation pattern. The main lobe and side lobes are generally visible in the radiation pattern when there is beamforming effect.

In the step S206, the computing device 30 obtains the first radiation pattern P_01 from the receiver 20, and compares the first radiation pattern P_01 with the predetermined radiation pattern P0 to calculate the pattern similarity score corresponding to the first phase set. The predetermined radiation pattern P0 may be a preset known information. The predetermined radiation pattern P0 may be stored in the receiver 20 or the computing device 30. The more similar the first radiation pattern P_01 is to the predetermined radiation pattern P0, the first phase set currently used is closer to the best beamforming calibration phase set.

In one embodiment, the predetermined radiation pattern P0 is a preset ideal radiation pattern. For example, the radiation pattern of the transmitter 10 may be simulated by simulation software to obtain the radiation pattern generated by the transmitter 10 when different phase sets are used, and the predetermined radiation pattern P0 is generated according to the simulation result. Alternatively an actual measurement may be performed after the transmitter 10 is manufactured. A measurement instrument may be disposed in the vicinity of the transmitter 10. Assume the just manufactured transmitter 10 has little hardware error or has passed the factory beamforming calibration. the radiation pattern recorded by the measurement instrument may serve as the predetermined radiation pattern P0. The approach that uses the preset ideal radiation pattern as the predetermined radiation pattern P0 may be referred to as off-line calibration. In this embodiment, the predetermined radiation pattern P0 generally has a single prominent main lobe. The energy of the side lobes is usually significantly smaller.

In another embodiment, the receiver 20 receives wireless transmission signal from the transmitting antennas 104_1-104_N to determine the predetermined radiation pattern P0 after a position of the receiver 20 is set, for example, the physical placement of the receiver 20 is determined and the geographical environment around the receiver 20 has been determined. In this case, the radiation pattern obtained by the receiver 20 at this time is used as the predetermined radiation pattern P0. For example, it is assumed there will be an ideal beamforming effect when the transmitter 10 has been off-line calibrated and there are no obstructions in space. However, due to the placement of the receiver 20, there is a possibility of multi-path transmission of wireless signals between the transmitter 10 and the receiver 20. Assuming the hardware error is not large at this time, signal received by the receiver 20 at this time may be used as the predetermined radiation pattern P0. The predetermined radiation pattern P0 thus obtained is stored in the receiver 20 and may be used for beamforming calibration in the future. Performing the beamforming calibration using the predetermined radiation pattern PO in this embodiment may be referred to as on-line calibration. In this embodiment, the main lobe and the side lobes in the predetermined radiation pattern PO usually have smaller energy difference due to the existence of multi-path effects.

Figure 4:
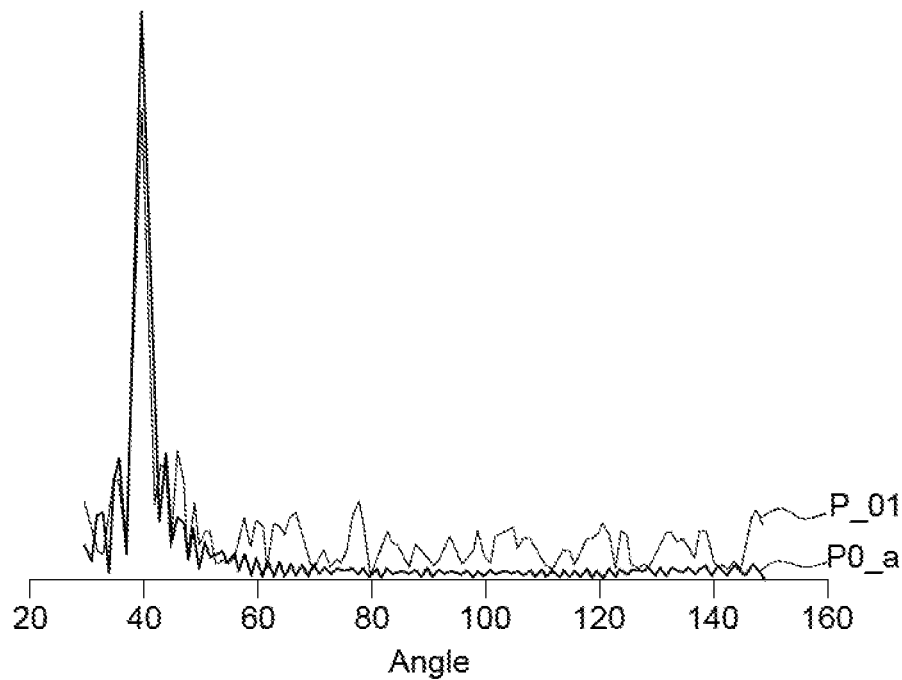
FIG. 4 shows a diagram illustrating the comparison between the radiation pattern and the predetermined pattern according to one embodiment of the disclosure.
Figure 5:
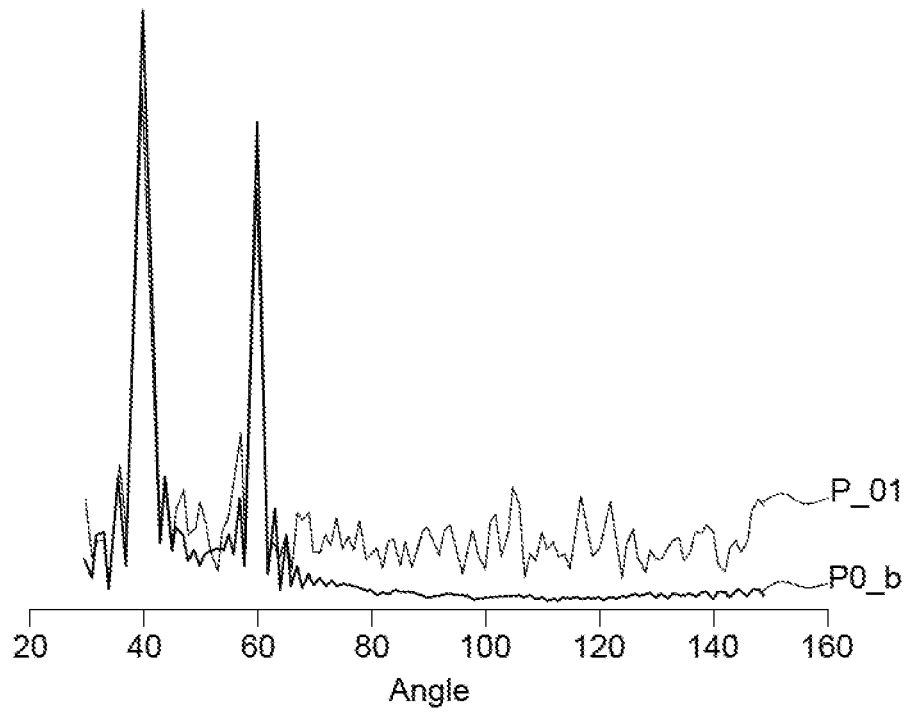
FIG. 5 shows a diagram illustrating the comparison between the radiation pattern and the predetermined pattern according to another embodiment of the disclosure.

Regarding the comparison between the first radiation pattern P_01 and the predetermined radiation pattern P0 in the step S206, examples may be referred in FIG. 4 and FIG. 5. FIG. 4 shows a diagram illustrating the comparison between the radiation pattern and the predetermined pattern according to one embodiment of the disclosure. The example in FIG. 4 is corresponding to the off-line calibration described above. The antenna radiation pattern is illustrated using linear coordinates in FIG. 4, where the horizontal axis is the angle, and the vertical axis is the signal strength. The predetermined radiation pattern P0_a has a single prominent main lobe (at 40 degree), whereas the first radiation pattern P_01 has higher side lobe energy (as compared to the predetermined radiation pattern P0_a) at angles other than 40 degree due to non-ideal effects from hardware errors. The computing device 30 may determine the degree of similarity (pattern similarity score) between the two patterns by calculating the difference between the first radiation pattern P_01 and the predetermined radiation pattern P0_a.

FIG. 5 shows a diagram illustrating the comparison between the radiation pattern and the predetermined pattern according to another embodiment of the disclosure. The example in FIG. 5 is corresponding to the on-line calibration described above. In this example, because there is multi-path effect, the predetermined radiation pattern P0_b has a main lobe (at 40 degree) and a side lobe (at 60 degree) whose energy is close to the main lobe. In contrast, the first radiation pattern P_01 has higher energy (as compared to the predetermined radiation pattern P0_a) at angles other than 40 degree and 60 degree due to non-ideal effects from hardware errors. The computing device 30 may determine the degree of similarity (pattern similarity score) between the two patterns by calculating the difference between the first radiation pattern P_01 and the predetermined radiation pattern P0_b.

The computing device 30 may repeatedly perform steps S202-S206 for multiple phase sets. In the step S208, the computing device 36 selects a calibration phase set among the multiple phase sets according to the pattern similarity score of each phase set. For example, the computing device 30 may select the phase set having the highest pattern similarity score as the calibration phase set. Alternatively, the computing device 30 may select the phase set that has the smallest difference between the actual radiation pattern and the predetermined radiation pattern during the calculation process in the step S206 as the calibration phase set. Next in the step S210, the computing device 30 transmits the obtained calibration phase set to the transmitter 10, such that the transmitter 10 uses the calibration phase set to perform beamforming in order to calibrate beamforming that is affected by the hardware errors.

In one embodiment, n the step S206 the computing device 30 may convert the received signal (corresponding to the first radiation pattern P_01) and the predetermined signal (corresponding to the predetermined radiation pattern P0) to the angle domain, and calculate the sum of energy differences at different angles to determine the pattern similarity score between the two patterns In the step S208 the computing device 30 may select the phase set that has the smallest difference between the radiation pattern, and the predetermined radiation pattern as the calibration phase set, for example, by using formula (1): $\min_{\Phi} \||Fa|-|Fg_e e^{-j\pi\Phi_e} e^{-j\pi\Phi}|\|_2^2$.

In the formula (1), F represents a function that converts the signal to the angle domain, a represents the predetermined signal. Take the transmitter 10 with 64 transmitting antennas as an example, $a=[\alpha_1, \ldots, \alpha_{64}]^T$. $g_e e^{-j\pi\Phi_e}$ represents the amplitude attenuation and phase rotation caused by hardware errors. $\Phi=[\phi_1, \ldots, \phi_{64}]^T$ represents the phase of each transmitting antenna. The purpose of the step S208 is to find the $\Phi$ that minimizes the formula (1).

According to the system shown in FIG. 2 and the flowchart shown in FIG. 3, the computing device 30 calculates the pattern similarity score of the multiple phase sets it provides, and selects, in step S208, the phase set having the highest pattern similarity score as the calibration phase set. This calibration method tests multiple phase sets that the transmitting antennas may use, such that the calibrated radiation pattern is close to the ideal radiation pattern.

The beamforming calibration method disclosed herein takes into account the impact of hardware errors, but does not require complex methods to directly estimate the amount of hardware errors. Instead, by observing the difference in the radiation patterns at the receiver, the codebook (the phase used by each transmitting antenna) used by the transmitter 10 is directly modified to achieve calibration. Because this beamforming calibration method is based on comparing the radiation patterns, not only the beamforming main lobe direction can be calibrated, but also the side lobe direction can be calibrated. In addition, the beamforming calibration method proposed in the present invention can be used for off-line testing and also for actual on-line operation testing.

There are several embodiments, including embodiments M1-M6 listed below, regarding the multiple phase sets that the computing device 30 provides to the transmitter 10 in the step S200. In the embodiments below, the transmitter 10 has N transmitting antennas. The phase rotator coupled to each antenna is controlled by a digital signal with B bits, resulting in $2^B$ possible phases for each antenna.

Embodiment M1: the multiple phase sets provided by the computing device 30 include all available phase sets of the multiple transmitting antennas 104_1-104_N. That is, the computing device 30 exhaustively provides every possible phase set, attempting $2^B$ possible phases for each antenna. The search space for the computing device 30 to find the best solution is $(2^B)^N$. The embodiment M1 is suitable for the transmitter 10 with smaller size, having a smaller number of transmitting antennas, or there are fewer phase selections that the phase rotators 103_1-103_N can set.

Embodiment M2: the computing device 30 is configured to obtain an initial phase set corresponding to the multiple transmitting antennas. The multiple phase sets provided by the computing device 30 include only phase sets close to the initial phase set. The initial phase set may be stored in the receiver 20 or the computing device 30. The search space in the embodiment M1 may be too large for most transmitters 10, and therefore the embodiment M2 does not attempt every $2^B$ possible phases for each antenna. Instead, only the phases close to (or adjacent to) the initial phase set (which is for example the best phase set obtained in the previous iteration) are tried upon. For example, one best solution is obtained after the beamforming calibration system 1 performs beamforming calibration. The best solution is then stored in the receiver 20. Next time when beamforming calibration is to be performed, the computing device 30 may first acquire the best solution obtained previously and set as the initial phase set.

FIG. 6 shows a diagram illustrating phase sets close to the initial phase set according to one embodiment of the disclosure. In the example shown in FIG. 6, each antenna has 10 possible phase states. After a previous iteration of beamforming calibration, the best phase states for antennas 1-5 are the phase state {3, 4, 5, 10, 7} respectively. The embodiment M2 may treat this phase set as the initial phase set and set a search window with size w as 3 (w=3 means the phases to be searched include the initial phase and the two phases that are most close to the initial phase). For example, only phase states 2, 3, 4 are searched for the antenna 1; only phase states 9, 10, 1 are searched for the antenna 4. (Because every 360-degree increase in phase angle constitutes one cycle, the ten possible phase states each antenna has can be considered as a loop, and thus the phase state 10 is considered as being adjacent to the phase state 1.)

The search space of the embodiment M2 is $w^N$, much smaller as compared to the embodiment M1 In addition, because better phase selections are usually near the previously obtained best phase set, the embodiment M2 is also capable of finding out a suitable calibration phase set. The search window size w is not limited to 3, and may also be other larger numbers. The search window size w may depend on factors such as the number of transmitting antennas. the computing power of the computing device 30, and the time allowed for the system to perform beamforming calibration.

Since the search space described in the embodiments M1 and M2 is likely to be too large for most transmitters 10, the following embodiments M3 to M6 all adopt grouped search method to narrow the search space. The computing device 30 is configured to divide the multiple transmitting antennas into multiple groups. The number of groups is for example P, and the number of transmitting antennas is each group is Q, where $$Q = \frac{N}{P}.$$

The computing device 30 is configured to sequentially determine a local optima phase set corresponding to each group, and to determine the calibration phase set according to the local optima phase set of each group.

In one embodiment, the phases of the transmitting antennas not belonging to the first group are kept at fixed values when the computing device 30 determines the local optima phase set of the first group. In other words, when searching the best solution for a particular group, the phases of other groups are kept constant. For example, the best solution (local optima phase set) for the group 1 is first searched while the phases in group 2-group P are kept at fixed values; after finding out the best solution for the group 1, the phases of the group 1 are kept at this best solution, and then search the best solution for the group 2, while the phases in group 3-group P are still kept at fixed values; the rest of the procedure can be derived accordingly. After the computing device 30 sequentially determines a local optima phase set for group 1-group P. the computing device 30 is said to complete one iteration. A beamforming calibration procedure may include performing multiple iterations, such as 1-4 iterations.

Embodiment M3: the multiple phase sets provided by the computing device 30 include all available phase sets of the transmitting antennas in the first group when the computing device 30 determines the local optima phase set of the first group. The search space for the computing device 30 to find the best solution is $(2^B)^Q \times P$.

Embodiment M4: the computing device 30 is configured to obtain an initial phase set corresponding to the multiple transmitting antennas. The multiple phase sets provided by the computing device 30 include only phase sets close to the initial phase set when the computing device 30 determines the local optima phase set of the first group. Similar to the embodiment M2, only the phases adjacent to the initial phase set within the search window are searched to reduce the search space. The search space or the computing device 30 to find the best solution is $(w)^Q \times P$. In this embodiment, a beamforming calibration procedure may include performing multiple iterations. The initial phase set used in each iteration may be the best solution found in the previous iteration.

Embodiment M5: this embodiment may be considered as a special case of the embodiment M3. The number of transmitting antennas in each group is 1 (P=N, Q=1). That is, the computing device 30 sequentially determines the local optimal phase for each antenna, from antenna 1 to antenna N. The search space for the computing device 30 to find the best solution is $2^B \times N$.

Embodiment M6: this embodiment may be considered as a special case of the embodiment M4. The number of transmitting antennas in each group is 1 (P=N, Q=1). The search space for the computing device 30 to find the best solution is w×N. In this embodiment, a beamforming calibration procedure may include performing multiple iterations. The, initial phase set used in each iteration may be the best solution found in the previous iteration.

The search method, the grouping method, the group size (a group size of N represents only one group, which means no dividing groups), and the search space used in the embodiments M1 to M6 are listed in the following Table 1. The beamforming calibration method proposed in the present disclosure is not limited to which particular embodiment. An appropriate embodiment can be selected based on the size of the transmitter 10 and the computing capability of the computing device 30. Table 1 below lists example values, making it easier to compare the size of the search space between different embodiments. The numbers used in the example are: the transmitter 10 has 32 transmitting antennas (N=32), the phase of each transmitting antenna can be determined by 4 bits (B=4), there are 16 possible phases for each transmitting antenna. When performing the grouping operation in the embodiments M3 to M4, the 32 transmitting antennas are divided into 8 groups (P=8), each group has 4 antennas (Q=4). The search window size is 3 (w=3) when searching for the phases neighboring the initial phase set.

TABLE 1

| | Group size | Adjacent phases only | Search space | Example number of the search space |
|---|---|---|---|---|
| M1 | N | No | $(2^B)^N$ | $3.4 \times 10^{38}$ |
| M2 | N | Yes | $w^N$ | $1.9 \times 10^{15}$ |
| M3 | Q | No | $(2^B)^Q \times P$ | 524,288 |
| M4 | Q | Yes | $(w)^Q \times P$ | 648 |
| M5 | 1 | No | $2^B \times N$ | 512 |
| M6 | 1 | Yes | $w \times N$ | 96 |

That various modifications and variations may be made to the disclosed embodiments. It is intended that the specification and examples be considered as exemplary only, with a true scope of the disclosure being indicated by the following claims and their equivalents.

What is claimed is:

1. A beamforming calibration system, comprising:
   a transmitter, comprising a plurality of transmitting antennas;
   a receiver; and
   a computing device configured to provide a plurality of phase sets to the transmitter;
   wherein when the computing device provides a first phase set among the plurality of phase sets to the transmitter: the transmitter is configured to use the first phase set to set phases of the plurality of transmitting antennas, the receiver is configured to receive wireless transmission signal from the transmitting antennas to obtain a first radiation pattern corresponding to the first phase set, and the computing device is configured to compare the first radiation pattern with a predetermined pattern to calculate a pattern similarity score corresponding to the first phase set;
   wherein the computing device is configured to select a calibration phase set among the plurality of phase sets according to the pattern similarity score of each phase set, and to provide the calibration phase set to the transmitter to calibrate beamforming.

2. The beamforming calibration system according to claim 1, wherein the predetermined radiation pattern is a preset ideal radiation pattern.

3. The beamforming calibration system according to claim 1, wherein the receiver receives wireless transmission signal from the plurality of transmitting antennas to determine the predetermined radiation pattern after a position of the receiver is set.

4. The beamforming calibration system according to claim 1, wherein the plurality of phase sets provided by the computing device include all available phase sets of the plurality of transmitting antennas.

5. The beamforming calibration system according to claim 1, wherein the computing device is configured to obtain an initial phase set corresponding to the plurality of transmitting antennas, and the plurality of phase sets provided by the computing device include only phase sets close to the initial phase set.

6. The beamforming calibration system according to claim 1, wherein the computing device is configured to divide the plurality of transmitting antennas into a plurality of groups, and the computing device is configured to sequentially determine a local optima phase set corresponding to each group, and to determine the calibration phase set according to the local optima phase set of each group.

7. The beamforming calibration system according to claim 6, wherein the plurality of groups comprise a first group, and the phases of the transmitting antennas not belonging to the first group are kept at fixed values when the computing device determines the local optima phase set of the first group.

8. The beamforming calibration system according to claim 7, wherein the plurality of phase sets provided by the computing device include all available phase sets of the transmitting antennas in the first group when the computing device determines the local optima phase set of the first group.

9. The beamforming calibration system according to claim 7, wherein the computing device is configured to obtain an initial phase set corresponding to the plurality of transmitting antennas, and the plurality of phase sets provided by the computing device include only phase sets close to the initial phase set when the computing device determines the local optima phase set of the first group.

10. The beamforming calibration system according to claim 6, wherein the number of transmitting antennas in each group is 1.

11. A beamforming calibration method for a transmitter, a receiver, and a computing device, the transmitter comprising a plurality of transmitting antennas, the beamforming calibration method comprising:
   providing, by the computing device, a plurality of phase sets to the transmitter;
   performing the following steps when the computing device provides a first phase set among the plurality of phase sets to the transmitter:
   (a) using, by the transmitter, the first phase set to set phases of the plurality of transmitting antennas;
   (b) receiving, by the receiver, wireless transmission signal from the transmitting antennas to obtain a first radiation pattern corresponding to the first phase set; and
   (c) comparing, by the computing device, the first radiation pattern with a predetermined pattern to calculate a pattern similarity score corresponding to the first phase set;
   selecting, by the computing device, a calibration phase set among the plurality of phase sets according to the pattern similarity score of each phase set; and
   providing, by the computing device, the calibration phase set to the transmitter to calibrate beamforming.

12. The beamforming calibration method according to claim 11, wherein the predetermined radiation pattern is a preset ideal radiation pattern.

13. The beamforming calibration method according to claim 11, further comprising:
  receiving, by the receiver, wireless transmission signal from the plurality of transmitting antennas to determine the predetermined radiation pattern after a position of the receiver is set.

14. The beamforming calibration method according to claim 11, wherein the plurality of phase sets provided by the computing device include all available phase sets of the plurality of transmitting antennas.

15. The beamforming calibration method according to claim 11, further comprising:
  obtaining, by the computing device, an initial phase set corresponding to the plurality of transmitting antennas, and the plurality of phase sets provided by the computing device include only phase sets close to the initial phase set.

16. The beamforming calibration method according to claim 11, further comprising:
  dividing, by the computing device, the plurality of transmitting antennas into a plurality of groups;
  sequentially determining, by the computing device, a local optima phase set corresponding to each group; and
  determining, by the computing device, the calibration phase set according to the local optima phase set of each group.

17. The beamforming calibration method according to claim 16, wherein the plurality of groups comprise first group, and the phases of the transmitting antennas not belonging to the first group are kept at fixed values when the computing device determines the local optima phase set of the first group.

18. The beamforming calibration method according to claim 17, wherein the plurality of phase sets provided by the computing device include all available phase sets of the transmitting antennas in the first group when the computing device determines the local optima phase set of the first group.

19. The beamforming calibration method according to claim 17, further comprising.
  obtaining, by the computing device, an initial phase set corresponding to the plurality of transmitting antennas, wherein the plurality of phase sets provided by the computing device include only phase sets close to the initial phase set when the computing device determines the local optima phase set of the first group.

20. The beamforming calibration method according to claim 16, wherein the number of transmitting antennas in each group is 1.

* * * * *